Aug. 28, 1934.  E. F. ZAPARKA  1,971,590
SUSTAINING DEVICE FOR AIRCRAFT
Filed Jan. 19, 1932  5 Sheets-Sheet 1

Aug. 28, 1934.  E. F. ZAPARKA  1,971,590
SUSTAINING DEVICE FOR AIRCRAFT
Filed Jan. 19, 1932  5 Sheets-Sheet 3

INVENTOR
Edward F. Zaparka
BY
Braselton Whitcomb Davis
ATTORNEYS.

Aug. 28, 1934. E. F. ZAPARKA 1,971,590
SUSTAINING DEVICE FOR AIRCRAFT
Filed Jan. 19, 1932 5 Sheets-Sheet 4

INVENTOR
Edward F. Zaparka
BY
Braselton, Whitcomb Davis
ATTORNEYS.

Aug. 28, 1934.                E. F. ZAPARKA                1,971,590
                       SUSTAINING DEVICE FOR AIRCRAFT
                         Filed Jan. 19, 1932     5 Sheets-Sheet 5

INVENTOR
Edward F. Zaparka
BY
Braselton, Whitcomb Davies
ATTORNEYS

Patented Aug. 28, 1934

1,971,590

UNITED STATES PATENT OFFICE

1,971,590

SUSTAINING DEVICE FOR AIRCRAFT

Edward F. Zaparka, New York, N. Y., assignor to Zap Development Corporation, Baltimore, Md., a corporation of Delaware Application January 19, 1932, Serial No. 587,570

35 Claims. (Cl. 244—12)

My invention relates in general to aircraft and has particular application to an arrangement whereby the total lift of a supporting surface is appreciably increased over that normally attainable without the use of this arrangement.

An object of the present invention is to provide an airfoil or a lifting unit combined with, or having, a movable means adapted to be so disposed at any setting thereof as to produce a lifting force of substantially greater proportions than heretofore obtained.

The invention contemplates the provision of means operating to position and maintain a depending flap member so that in no position will its trailing edge materially extend forwardly of the trailing edge of the lifting unit although it may project rearwardly and downwardly thereof, thereby variably increasing the effective lift at the will of the operator by forming an obstruction, which not only prevents the equalization of pressure around the trailing edge, but may also increase the vacuum on the upper portion of the unit.

Many other objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1:
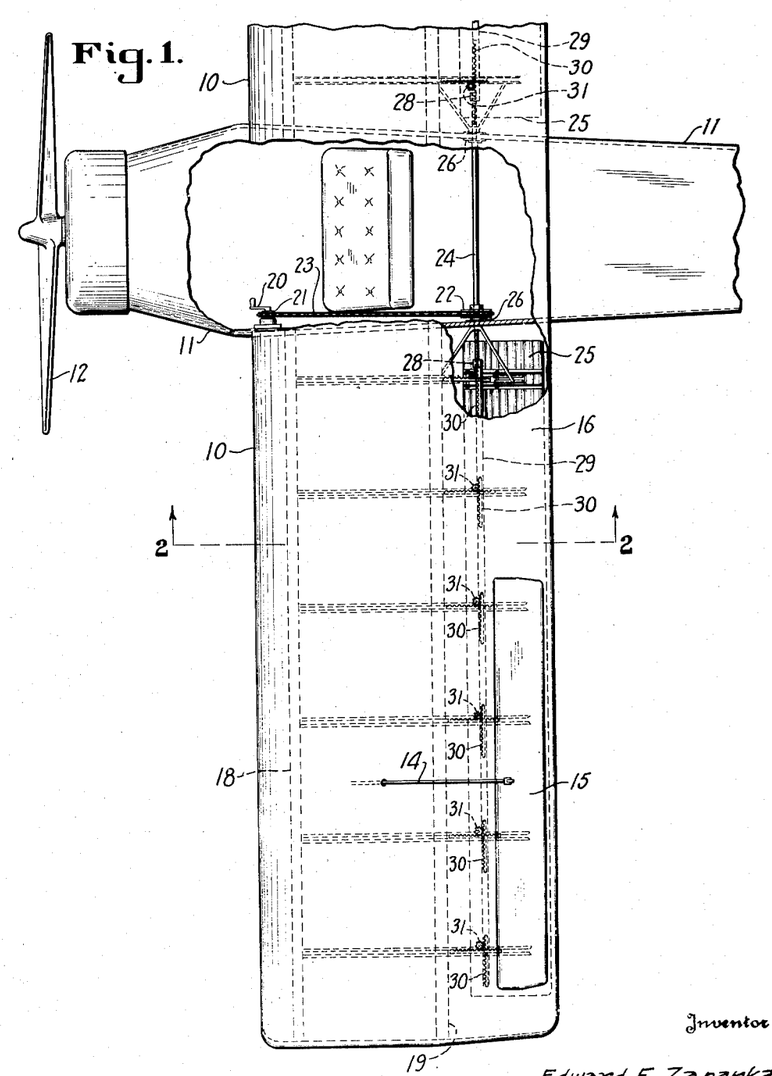
Figure 1 is a top plan view of a portion of an aircraft in which has been incorporated an embodiment of my invention.

Referring to Figure 1 of the drawings, I have illustrated one embodiment of my invention incorporated in an aircraft in which numeral 10 indicates the stationary airfoil or wings secured to the fuselage or main body portion 11 carrying a suitable engine or prime mover adapted to drive propeller 12. The ailerons, one of which has been illustrated at 15, (the combination illustrated being the subject of a separate application) may be operated by suitable means such as rods 14, for controlling the lateral position of the aircraft, or the conventional arrangement and location of ailerons can be used with a reduction of flap span. The airfoil or supporting surfaces are here illustrated as having an upper surface 16, shaped to decrease the air pressure thereon in flight, a lower surface 17, shaped to increase the air pressure thereon in flight, between which are positioned a front spar 18 and a rear spar 19.

The movable element 25 adapted to produce a lifting force and increase the lifting efficiency of the airfoil in the manner hereinafter described is here shown in the form of a longitudinally extending flap positioned adjacent the stationary airfoil 10.

Figures 3, 4, 5, 6, 7:
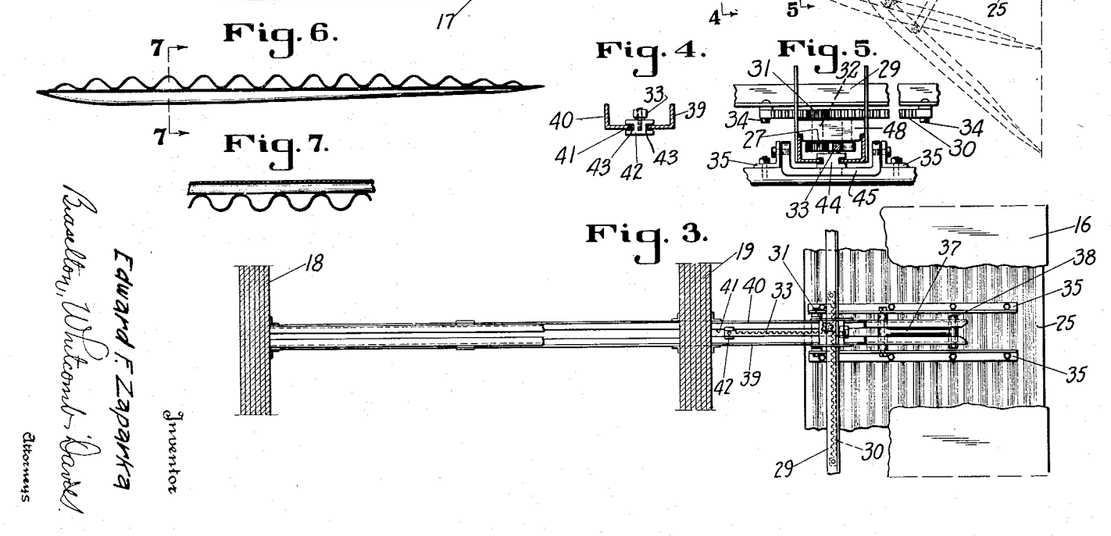
Figure 3 is a sectional detail view taken substantially on a line 3—3 of Figure 2.
Figure 4 is an enlarged sectional detail taken substantially on a line 4—4 of Figure 2.
Figure 5 is an enlarged sectional detail taken substantially on a line 5—5 of Figure 2.
Figure 6 is a side elevation of the depending flap forming a part of my invention.
Figure 7 is a sectional view taken substantially on a line 7—7 of Figure 6.

The flaps 25 may be of any suitable material or of any material suitably treated for protecting the same from the action of the elements. One construction has been shown in Figures 6 and 7, wherein the flaps 25 are suitably made of a corrugated material, such as light metal, the corrugations in the upper and lower surfaces lying in opposite directions.

As more clearly illustrated in Figures 2 to 5, one embodiment of the present invention whereby both a transition and tilting of the flap 25 may be accomplished is by pivotally connecting the flap to a toothed bar or rack 33 with which pinion 27 engages to move the rack 33 substantially parallel to the lower surface of the stationary airfoil 10. It is to be understood that the sustaining element may be carried in any part of the airfoil 10, and the rack 33 may be moved at any desirable angle with respect thereto.

As one embodiment, I have chosen to illustrate means such as crank 20 (see Figure 1) for rotating the rod 24 through intermediate mechanism such as gears 21 and 22 and chain 23. Rod 24 suitably supported in bearings 26 is oppositely threaded on each end so that upon rotation thereof, the internally threaded members 28 cooperating therewith may be moved toward and away from the fuselage 11. Threaded members 28 may be integral with or secured to longitudinally disposed angular members or bars 29, to which are secured by means such as bolts 34 a plurality of racks 30 (see Figures 3 and 5) adapted to mesh with pinions 31 supported upon one end of short shafts 32. Shafts 32 suitably journalled in bracket 48 also carry similar pinions 27 on their opposite ends which are in mesh with the tooth bars or racks 33 to which are pivotally connected the movable elements 25. Arranged on the upper surface of elements or flaps 25 are pairs of angular members 35 having their perpendicular faces substantially parallel and forming connecting means between the flaps 25 and the operating mechanism, which is suitably carried by a support arrangement 36 of rigid construction and corresponding substantially to the shape of the rear of the airfoil (see Figure 2). The supports 36 are preferably made from members having angular cross sections, and carry near the rear thereof a pivoted link 37, secured by suitable means such as bolt 38. The angular members 39 and 40 are positioned to form a track like structure 41 for the slidable blocks 42 in which are oppositely disposed slots or grooves 43. I prefer to position one of blocks 42 at each end of the rack 33 to insure sufficient support for and positive movement of the rack during operation. Due to the fact that I have found it desirable that the leading edge of the flap move in a horizontal position adjacent the lower surface of airfoil, I secure another block 44, adapted to slide in track 41, to the flap through a U-shaped member 45 pivotally connected to the angle brackets 35 secured to the flaps. I have pivoted the other end of link 37 to the angle brackets 35 so its position with respect to the flap is forwardly of the center thereof, and thus, upon rearward or outward movement of the flap the link tends to move toward the perpendicular as shown in the dotted line positions in Figure 2, thus maintaining the trailing edge substantially in a perpendicular line during movement to and from its effective position.

Figure 2:
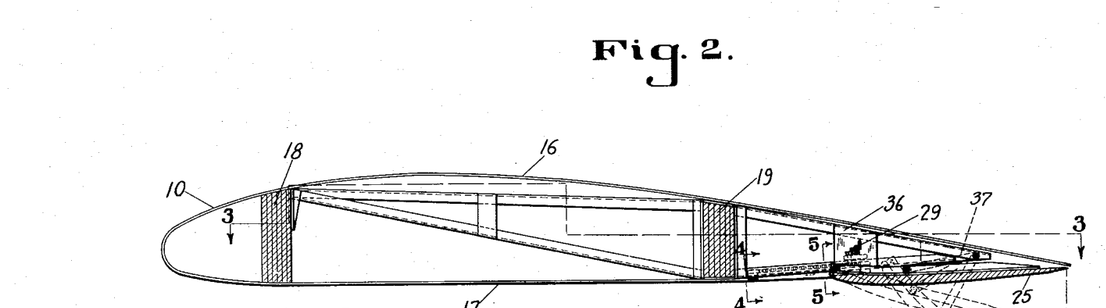
Figure 2 is a sectional detail view taken substantially on a line 2—2 of Figure 1.

To secure desirable bracing means between the front and rear spars, I have provided the triangular members 46 and 47 composed of a plurality of suitably positioned elements, to insure sufficient structural strength to carry the flap 25 and its operating mechanism. Thus it will be noted that support 36 secured to the rear of the spar 19, is also supported by the front spar 18 through the members 46 and 47, forming a substantially unitary structural element.

By my invention, it will be understood that the operator moves the flap 25 into any of the various positions illustrated in the drawings, by rotating handle 20, which through gears 21 and 22 and chain 23 rotates rod 24 causing longitudinal movement of bars 29, so that the increased drag on the lower side of the airfoil effective during take-off may be reduced to a minimum or completely eliminated in flight. The movement of bars 29 is transmitted to tooth bars or racks 33 through pinions 31, shafts 32 and pinions 27 cooperating therewith, so that racks 33 are moved substantially at right angles to bars 29. Such movement is imparted to the flaps 25 which are in this instance pivoted to blocks 44, slidably mounted in track 41. As link 37 has its extremities pivoted to the bracket 35 and to the support 36, any translatory movement of the flap will cause its trailing edge to move substantially vertically downward, while the leading or pivoted edge moves in substantially a straight line. Thus by the mechanism shown, two movements are imparted to the flap 25 to vary its position relative to the airfoil 10. I regard the action of moving the flap in such manner that its trailing edge is always substantially in line with or rearwardly of the trailing edge of airfoil 10, of vital importance for effective results, this feature being of the utmost importance.

My invention accomplishes, among other things, such a change in the airflow around the airfoil as to prevent a tendency of the exchange of energy from the pressure side to the vacuum side around the trailing edge thus actually increasing the "effective" air circulation, and to produce higher specific lift per unit area of the airfoil at same or lower angle of incidence than for the basic airfoil, so that take-off and landing is obtained at a much lower air speed than heretofore possible. It is to be noted that the flaps provided, form a positive stop enclosure for the flow of air directly around the trailing edge of the airfoil 10 from the lower side to the upper side.

Figures 8, 9:
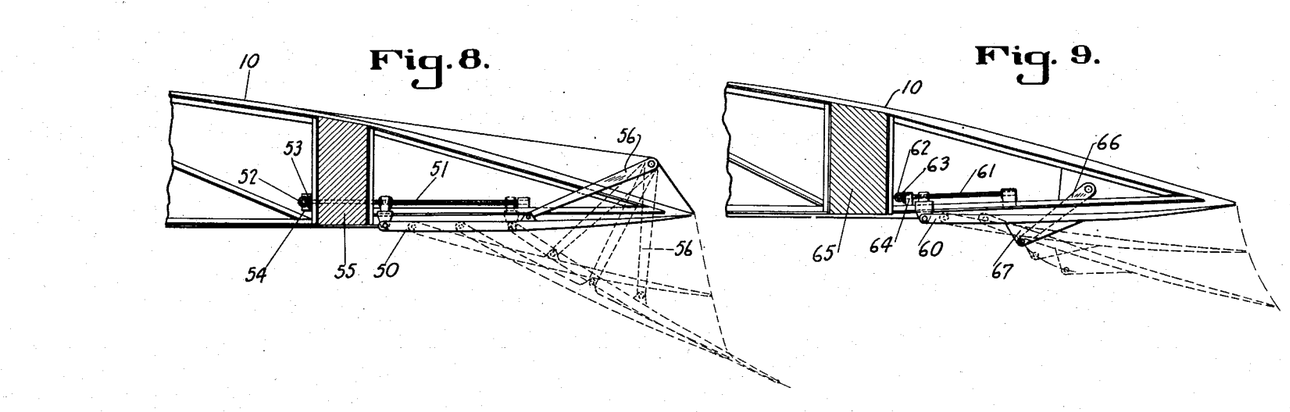
Figures 8, 9 and 10 are views similar to Figure 2 showing modified arrangements of the invention.

In Figure 8, I have illustrated another embodiment of my invention wherein an airfoil 10 with a depending flap 50 is pivoted to a member cooperating with a screw threaded bar or rod 51 adapted to be rotated through bevels 52 and 53 positioned by bracket 54 mounted on spar 55. It will be noted that one end of link 56 is pivoted to the flap at substantially its midpoint, and the other end is pivoted at a point above the trailing edge of the airfoil, thus upon rotation of threaded rod 51, flap will be moved downwardly and rearwardly so that the trailing edge of the flap will extend beyond the trailing edge of the airfoil an increasing amount the further it is extended.

In Figure 9, I have illustrated a further embodiment of my invention by providing an airfoil 10 with a depending flap 60 pivoted to a member cooperating with a screw threaded bar or rod 61 adapted to be rotated through bevels 62 and 63 carried by brackets 64 mounted to the rear of spar 65. Link 66 is pivoted to a point within the airfoil and opposite end of link being pivoted to a bracket 67 below the flap 60 a series of positions of the trailing edge thereof will be similar to those shown in Figure 8.

Figures 10, 11:
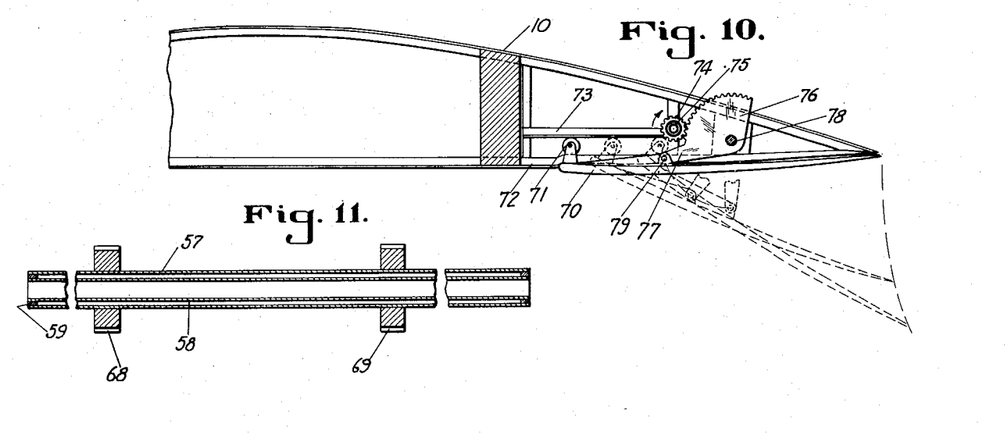
Figure 11 is a sectional detail of one form of rod suitable for controlling the mechanism of my invention.

In a further embodiment illustrated in Figure 10, I have provided an airfoil 10 with a depending flap 70 carrying a roller 71 positioned adjacent the leading edge thereof and adapted to move between two parallel tracks 72 and 73. Gear 74 supported on drive rod or bar 75 cooperated with segmental gear 76 having arm 77 extending therefrom to which flap 70 is pivoted at 79. Segmental gear 76 is pivoted within the airfoil 10 as at 78 and thus it will be noted that upon rotation of gear 74, arm 77 will move flap 70 downwardly and rearwardly to the several positions similar to those in Figures 8 and 9.

Figure 11 illustrates a type of rod construction suitable for operating my mechanism and is comprised of two tubes, the diameter of tube 57 being such that tube 58 may be inserted therein and secured in some suitable manner as by welding as shown at 59. Gears 68 and 69 may also be secured to tube 57 in a suitable manner as by welding.

Figures 12, 13:
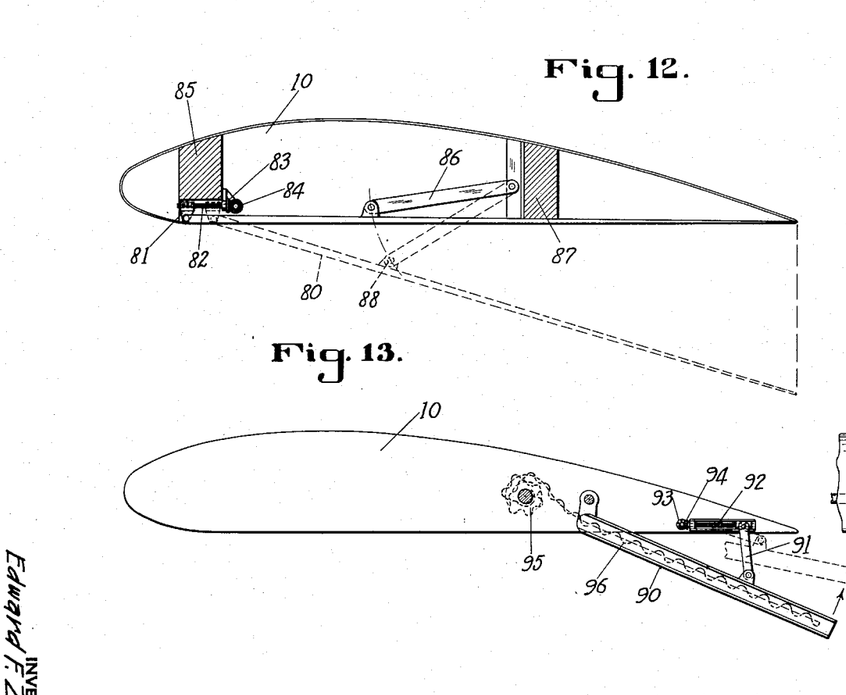
Figures 12 and 13 are views similar to Figure 2 showing modified arrangements of my invention.

The embodiment disclosed in Figure 12, shows an airfoil 10 with a depending flap 80 of substantially the width of the airfoil being pivoted to member 81 adapted to movement along screw threaded bar or rod 82 operated through bevels 83 and 84 secured to front spar 85. Pivotal link 86 has one end thereof pivoted near the rear spar 87 and the other end to a bracket 88 on flap 80. Operation of the threaded rod 82 causes rearward and downward movement of flap.

Figure 14:
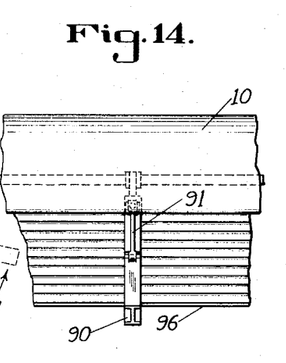
Figure 14 is a top plan view of a portion of the modification shown in Figure 13.

In Figures 13 and 14, I have illustrated a still further embodiment of my invention, wherein the airfoil 10 pivotally supports a depending member 90 angularly adjustable through pivotal link 91 operated through a screw threaded rod or bar 92 which receives its rotation through bevels 93 and 94. Forwardly of depending member 90 I provide a toothed member or reel 95 cooperating with flexible shutter like flap member 96, which may be detracted from effective position by rotation of toothed member.

Figure 15:
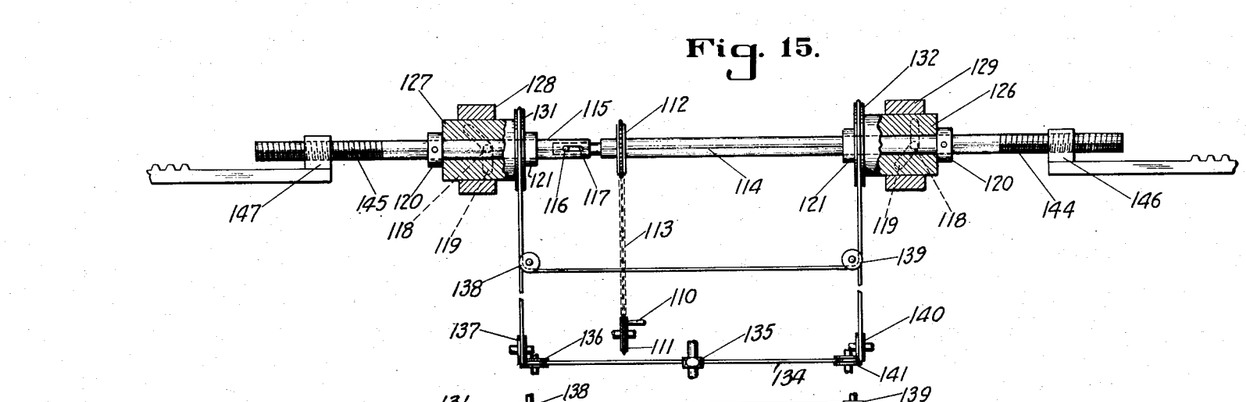
Figure 15 is a fragmentary view, certain parts being shown in section, of a modified arrangement of control means forming a part of my invention.
Figure 16:
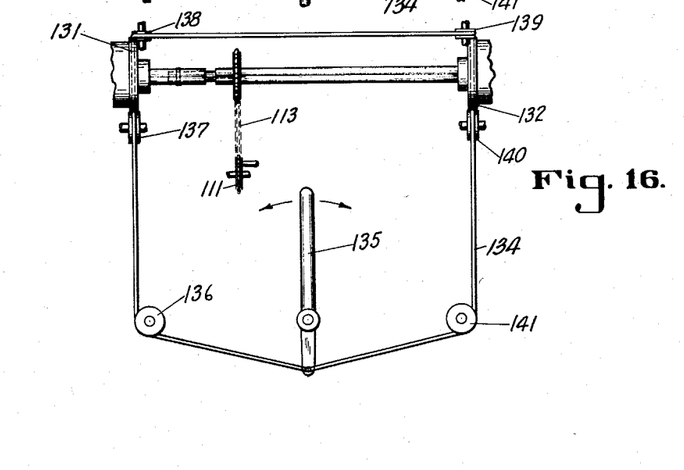
Figure 16 is another view of the arrangement shown in Figure 15.

In Figures 15 and 16, I have illustrated another embodiment of flap control mechanism in which a suitably positioned crank member 110 is operatively connected through pulley 111, cable 113 and pulley 112 to a shaft 114. The shaft 114 is telescopingly connected to shaft 115, longitudinal movement being permitted therebetween by pin 116 carried by shaft 114 and slot 117 in shaft 115. Rotatably mounted upon oppositely threaded shafts 114 and 115 are cam members 126 and 127 respectively, positioned by collars 120 and 121 and supported in bearings 128 and 129. Threaded portions 144 and 145 of the shafts cooperate with rack members 146 and 147 to produce longitudinal movement of the rack members, upon rotation of shafts 114 and 115. Pins 118 carried by the shafts cooperate with cam surfaces 119 for a purpose hereinafter more fully described. Integral with the cam members 126 and 127 are pulleys 131 and 132 adapted to rotate members 126 and 127 in opposite directions by means of cable 134 connected to a stick or control member 135. Cable 134 is suitably guided by pulleys 136 and 137 around pulley 131 to pulleys 138 and 139, around pulley 132 to pulleys 140 and 141.

In this embodiment, crank 110 is rotated, which in turn rotates shafts 114 and 115 in the same direction, due to the fact that they are connected together by means of the pin 116 and slot 117, which rotation moves rack members 146 and 147 simultaneously inwardly or outwardly producing a similar action to the flap members 25 as described with reference to Figures 1 and 2. Upon movement of stick 135 to the left or right as viewed in Figure 16, cam members 126 and 127 are rotated in opposite directions, and due to the angularity of the cam slots 119, cam members 118 move the shafts in the same direction, the pin 116 and slot 117 providing a suitable lost motion connection. As members 126 and 127 are freely supported upon their respective shafts, movement of stick 135 will not rotate the shafts, but will cause longitudinal movement thereof. Thus it will be noted that racks 146 and 147 will move in the same direction, such movement causing one flap to swing upwardly and the other flap downwardly. With such an arrangement it is possible to eliminate the ailerons 15 shown in Figure 1, as the effective movement of the flaps in opposite directions performs the same function.

Various other modifications of the invention as disclosed may be made, and, therefore, I do not wish to be restricted to the particular embodiments shown.

In the forms of flap shown, for instance in Figures 12 and 2, and possibly some of the other figures, I have shown a flap whose trailing edge in positions of extension and retraction lies substantially directly below the trailing edge of the wing. Another way of stating this is to say that in positions of extension and retraction the trailing edge of the flap shall lie substantially within the locus of perpendiculars to the wing chord which pass through the trailing edge of the wing. This location of the flap wherein the trailing edge of the flap shall lie within the locus of lines which pass through the trailing edge of the wing and are perpendicular to the datum lines of the wing sections gives a very excellent lift coefficient for the wing with but small change in the aerodynamic longitudinal metacenter of the airplane for the various positions of the flap.

What I claim is:—

1. In an aircraft, an airfoil; a pivoted flap associated with the pressure side of said airfoil and located under a fixed portion of the airfoil surface to increase the lift coefficient, said flap having a forward edge adapted for movement fore and aft; and support members for said flap lying substantially wholly without the airstream along the pressure side of said airfoil.

2. In an aircraft, an airfoil; a pivoted flap associated with the pressure side of said airfoil and below a fixed portion thereof to vary the lift coefficient thereof, said flap having its leading edge adapted for movement fore and aft; and a link to which said flap is pivoted lying substantially wholly without the airstream along the pressure side of said airfoil.

3. In an aircraft, an airfoil; a flap pivoted to a member adapted for movement fore and aft, said flap being located under a fixed portion of the airfoil; means for moving said member; and means for positioning said flap to increase the drag on the lower side of said airfoil, said means including a pivotal connection between said airfoil and said flap, said pivotal connection lying substantially without the airstream on both the upper and lower surface of the airfoil.

4. In an aircraft, an airfoil construction comprising an upper surface; a lower surface, said surfaces arranged to produce in flight a reduction in pressure above the upper surface and an increase in pressure below the lower surface; a downwardly extendable member located to the rear of the center of the lower surface to increase the pressure on the lower surface and reduce the turbulence on the rearward portion of the upper surface; and means whereby said member is moved rearwardly and angularly with respect to said lower surface so that the trailing edge of said member travels in substantially a straight line to and from one position to another.

5. In an aircraft, an airfoil construction comprising an upper surface; a lower surface, said surfaces arranged to produce in flight a reduction in pressure above the upper surface and an increase in pressure below the lower surface; an obstruction element extendable angularly from said airfoil to increase the pressure under the lower surface and reduce the turbulence on the rearward portion of the upper surface; and means for applying translatory movement to said element in any angular position so that the trailing edge of said element travels in substantially a straight line to and from one position to another.

6. An aircraft sustension body comprising an upper surface, a lower surface, said surfaces uniting in a projecting nose and intersecting at the trailing edge, in combination with a surface located in proximity to said trailing edge and extending longitudinally of said body arranged to cut off interchange of pressure around the trailing edge from the lower surface to the upper surface, and to increase the pressure on the lower surface, and means to adjust said surface horizontally and angularly to various positions with respect to said lower surface so that the trailing edge of said cut off surface travels in substantially a straight line to and from one position to another.

7. In an aircraft, an airfoil construction comprising an upper surface; a lower surface, said surfaces arranged to produce in flight a reduction in pressure above the upper surface and an increase in pressure below the lower surface; a member adapted for movement substantially parallel to said lower surface; downwardly directed means pivotally connected to said member to increase the pressure on the lower surface and reduce the turbulence over the upper surface; and means whereby the action of said last mentioned means is varied so that the trailing edge of said member travels substantially within the locus of lines perpendicular to the wing datum line and passing through the trailing edge of the wing.

8. A sustension body having a curved upper surface; a lower surface intersecting the same at the trailing edge, said surfaces arranged to produce in flight a reduction of pressure above the upper surface, an increase of pressure below the lower surface; a longitudinally movable member between said surfaces, said longitudinal member supporting an obstruction and arranged to provide an increase in pressure on the lower surface and prevent an interchange of the increased pressure on the lower surface and reduced pressure on the upper surface, and means to adjust said member to various positions with respect to said lower surface so that the trailing edge of said member travels substantially within the locus of lines perpendicular to the wing datum line and passing through the trailing edge of the wing.

9. In an aircraft, a movable force producing body, having opposed surfaces arranged to produce an increase in pressure on one surface and a reduction of pressure on the other surface in combination with means to introduce a drag, said means being so located with respect to one of said surfaces as to further increase the pressure on said surface and further reduce the pressure over the other surface, said means operating to substantially prevent equalization of pressure around the trailing edge of said surfaces, and means to move one portion of said first mentioned means substantially parallel to one of said surfaces and the remaining portion angularly thereto so that the trailing edge of said drag producing means travels substantially within the locus of lines perpendicular to the wing datum line and passing through the trailing edge of the wings.

10. In an aircraft, an airfoil construction comprising an upper surface; a lower surface, said surfaces arranged to produce in flight a reduction of pressure above the upper surface and an increase in pressure below the lower surface; and a relatively rigid element connected to said airfoil and adapted for longitudinal and angular movement thereon to increase the pressure on the lower surface and reduce the turbulence on the rearward portion of the upper surface, and means to vary the position of said element so that the trailing edge of said element travels substantially within the locus of lines perpendicular to the wing datum line and passing through the trailing edge of the wing.

11. In an aircraft, a support; a plurality of members carried by said support; means to change the relative position of one of said member with respect to said support; and means to change the angularity of the normal planes passing through said members, whereby the extremity of one member moves in a substantially vertical plane with respect to the normal plane of said members.

12. In an aircraft, a support; a member carried by said support; a second member carried by and adjustable with respect to said member; and means to vary the angularity of said second member with respect to the normal plane of said first member, whereby the extremity of the second member moves in a plane substantially vertical to the normal plane of said first member.

13. In an aircraft, a support; an airfoil carried by said support; a member pivoted to and adjustable relative to said airfoil; and means to vary the angularity of said member with respect to the airfoil, whereby the extremity of the member moves substantially within the locus of lines drawn perpendicular to the datum line of the airfoil section and passing through the trailing edge of the airfoil.

14. In an aircraft, a composite airfoil comprising a plurality of members; means to change the relative positions of said members and the angularity of one member with respect to the airfoil, whereby the extremity of one member moves in a substantially vertical plane with respect to the datum lines of the airfoil sections.

15. In an aircraft, an airfoil having upper and lower surfaces uniting to form a nose portion and a trailing edge; an obstruction having a trailing edge terminating at the trailing edge of said airfoil; means for projecting said obstruction angularly from said airfoil; said means including means to move the trailing edge of said obstruction in a substantially vertical plane during said angular projection.

16. An aircraft sustention body comprising an upper surface, a lower surface, said surfaces uniting in a projecting nose and intersecting at the trailing edge, in combination with a surface element located in proximity to said trailing edge and extending longitudinally of said body arranged to increase pressure on the lower surface, and to prevent or reduce interchange of the increased pressure on the lower surface and reduced pressure on the upper surface, and means to adjust said surface element horizontally and angularly to various positions with respect to said lower surface so that the trailing edge of said element travels substantially within the locus of lines perpendicular to the wing datum line and passing through the trailing edge of the wing.

17. A sustention body having a curved upper surface; a lower surface intersecting the same at the trailing edge, said surfaces arranged to produce in flight a reduction of pressure above the upper surface, an increase of pressure below the lower surface; a longitudinally movable member between said surfaces, said longitudinal member supporting an obstruction and arranged to provide an increase in pressure on the lower surface and prevent or reduce interchange of the increased pressure on the lower surface and reduced pressure on the upper surface, and means to adjust said member to various positions with respect to said lower surface so that the trailing edge of said member travels substantially within the locus of lines perpendicular to the wing datum line and passing through the trailing edge of the wing.

18. In an airplane, a wing, an extensible wing flap having a forward and a rear edge, and means to cause the forward edge and the rearward edge to have substantially straight line movements during extension and retraction, the directions of said movements being at substantially right angles to each other.

19. A wing flap construction for airplanes comprising a wing, a wing flap, a member adapted for controlled reciprocation in substantially the plane of the wing chords and attached to the flap near its forward end, a link support between the wing surfaces, a link pivoted to the flap at one end and to the link support at the other, the length of the link and the controlled reciprocation of the member being so correlated as to cause the rear edge of the flap when being extended to travel substantially within the locus of lines perpendicular to the wing chords and passing through the trailing edge of the wing.

20. In a wing construction for airplanes, the combination of an airfoil, a wing flap, a U-shaped bracket pivoted to said flap adjacent its forward edge, means upon which said U-shaped bracket may be reciprocated forwardly and rearwardly of said main airfoil, and a fixed link pivoted at one end to said flap and at its other end to said main airfoil between the upper and lower surfaces thereof whereby when said U-shaped bracket is moved the rear edge of the flap will travel substantially within the locus of lines perpendicular to the wing chord and passing through the trailing edge of the wing.

21. In a wing construction for airplanes, the combination of an airfoil, a wing flap, a pivot pivoted to said flap adjacent the forward edge of said flap, means upon which said pivot may be reciprocated forwardly and rearwardly of said main airfoil, and a fixed link pivoted at one end to said flap and at its other end to said main airfoil between the upper and lower surfaces thereof whereby when said pivot is moved the rear edge of the flap will travel substantially within the locus of lines perpendicular to the wing chord and passing through the trailing edge of the wing.

22. A wing flap construction for airplanes comprising a wing, a wing flap, a member adapted for controlled reciprocation in substantially the plane of the wing chords and attached to the flap adjacent its forward end, a link support above the trailing edge of the upper wing surface, and a link pivoted to the flap at one end and the link support at the other.

23. A wing flap construction for airplanes comprising a wing, a wing flap, a member adapted for controlled reciprocation in substantially the plane of the wing chords and attached to the flap adjacent its forward end, a link support above the trailing edge of the upper wing surface, a link supported to the flap at one end and to the link support at the other, the length of the link and the controlled reciprocation of the member being so correlated as to cause the rear edge of the flap when being extended to move downwardly and to the rear.

24. A wing flap construction for airplanes comprising a wing, a wing flap, a member adapted for controlled reciprocation in substantially the plane of the wing chords and attached to the flap adjacent its forward end, a link support between the wing surfaces, and a link pivoted to the flap at one end and to the link support at the other.

25. A wing flap construction for airplanes comprising a wing, a wing flap, a member adapted for controlled reciprocation in substantially the plane of the wing chords and attached to the flap adjacent its forward end, a link support between the wing surfaces, and a link pivoted to the flap at one end and to the link support at the other, the length of the link and the controlled reciprocation of the member being so correlated as to cause the rear edge of the flap when being extended to move downwardly and to the rear.

26. A wing flap construction for airplanes comprising a wing, a wing flap, a sliding member attached to the forward end of the flap adapted for forward and rearward reciprocation, a sector member pivoted between the upper and lower wing surfaces, means on the flap pivoted to the sector, and means to rotate the sector to extend and retract the flap.

27. A wing flap construction for airplanes comprising a wing, a wing flap, a sliding member attached to the forward end of the flap adapted for forward and rearward reciprocation, a sector member pivoted between the upper and lower wing surfaces, means on the flap pivoted to the sector, and means to rotate the sector to extend and retract the flap, the point of pivoting of the sector, the length of the flap, and the pivoting of the flap to the sector being such as to cause the rear edge of the flap when being extended to move downwardly and to the rear.

28. A wing flap construction comprising a wing, a flexible shutter like wing flap, guides along which the shutter light wing flap is adapted to move, means to adjust the position of the guides, and means to extend and retract the flap along the guides.

29. In an aircraft, an airfoil construction comprising an upper surface, a lower surface, said surfaces arranged to produce a difference in pressure above the upper surface relative to the pressure below the lower surface, said upper surface being relatively immovable with respect to said airfoil body and to said other surface, and downwardly directed means connected to said airfoil comprising a drag producing surface independent of said upper surface; a reciprocable pivot for said surface connected to said airfoil, and means whereby when said pivot is reciprocated the trailing edge of said surface moves downwardly from said airfoil substantially adjacent the locus of lines perpendicular to the datum line of the airfoil and passing through the trailing edge of said airfoil.

30. In an aircraft, an airfoil construction comprising an upper surface, a lower surface, said surfaces arranged to produce a difference in pressure above the upper surface relative to the pressure below the lower surface, said upper surface being relatively immovable with respect to said airfoil body and to said other surface, and downwardly directed means connected to said airfoil comprising a drag producing surface independent of said upper surface; a link pivoted at one end above the lower surface of the airfoil and at its other end to said drag producing surface whereby when said pivot is reciprocated the trailing edge of said surface moves downwardly from said airfoil substantially adjacent the locus of lines perpendicular to the datum line of the airfoil and passing through the trailing edge of said airfoil.

31. In an airplane, the combination of a wing with a wing flap whose trailing edge in positions of extension and retraction is adapted to lie substantially directly below the trailing edge of the wing.

32. In an airplane, the combination of a wing with a wing flap whose trailing edge is adapted to lie substantially within the locus of perpendiculars to the datum lines of the wing sections which pass through the trailing edge of the wing.

33. In an aircraft, an airfoil; means associated with the pressure side of said airfoil to vary the lift coefficient, said means including a supplemental element having its leading edge adapted for movement substantially parallel to the chord of said airfoil, and means for operatively supporting said element which lie substantially wholly without the air stream over the pressure side of the airfoil.

34. In an aircraft, an airfoil, means associated with the pressure side of said airfoil to vary the lift coefficient, said means including a supplemental element adapted to be extended from the lower surface of the airfoil at an angle to the airfoil chords which is greater than thirty degrees, said supplemental element having its leading edge adapted for movement substantially parallel to the chord of the airfoil, and means for operatively supporting said element which lie substantially wholly without the airstream over the pressure side of the airfoil.

35. In an airplane, the combination of a wing with a wing flap which is adapted to be extended below the wing to positions wherein it makes an angle greater than thirty degrees with the datum lines of the wing sections, said flap having its trailing edge in positions of extension and retraction adapted to lie substantially within the locus of perpendiculars to the datum lines of the wing sections which pass through the trailing edge of the wing.

EDWARD F. ZAPARKA.